Aug. 7, 1962 J. A. LEE 3,048,407

DISC-RECORD PLAYING APPARATUS

Filed July 1, 1960

3,048,407
Patented Aug. 7, 1962

3,048,407

DISC-RECORD PLAYING APPARATUS

James Alexander Lee, Highworth, England, assignor to The Plessey Company Limited, London, England, a British company Filed July 1, 1960, Ser. No. 40,485
3 Claims. (Cl. 274—23)

This invention relates to disc-record playing apparatus and although it is also applicable to single-record playing gramophones and like devices, it is more particularly intended for use in connection with so-called record changers in which the tone arm is automatically moved into playing position when the switch of the apparatus has been operated to start the motor.

In order to avoid damage to the transducer on the tone arm and more particularly to the stylus thereof, it is necessary to provide means whereby the arm carrying the pick-up device, hereinafter referred to as the tone arm, can be fixed in a so-called rest position. Various kinds of clips have hitherto been used for this purpose. These devices generally have the inconvenience that it may be overlooked to release the device before switching on the gramophone motor, and this is liable to lead to damage of the apparatus more particularly in the case of record changers where the drive-operated device for moving the tone arm from its position of rest to the starting position on the record will encounter the resistance of the tone-arm locking means. The present invention has for an object to avoid this inconvenience and to ensure that the tone arm is free to move as soon as the gramophone motor has been switched on.

According to the present invention coupling means are provided between the switch for the gramophone motor and the tone-arm locking-device whereby movement of the gramophone switch to start the gramophone motor will displace the locking means from the position in which the tone arm is locked to a position in which the tone arm is free to be moved. Preferably, the coupling means are of the unidirectional-action kind, so as to permit the switch to be moved to the stop position without moving the tone-arm locking-means into the operative position. This is desirable since generally the switch is so arranged that it can be moved to the stop position irrespective of the position of the tone arm, and movement of the locking means to the operative position would at least increase the resistance to the return of the tone arm to its position of rest after movement of the switch-operating element to its stop position.

An improvement of the invention is illustrated in the drawing accompanying the specification in which FIGURE 1 is a plan view showing part of the gramophone base plate with the on/off switch knob in the "off" position and the tone arm locked on its rest.

Figure 1:
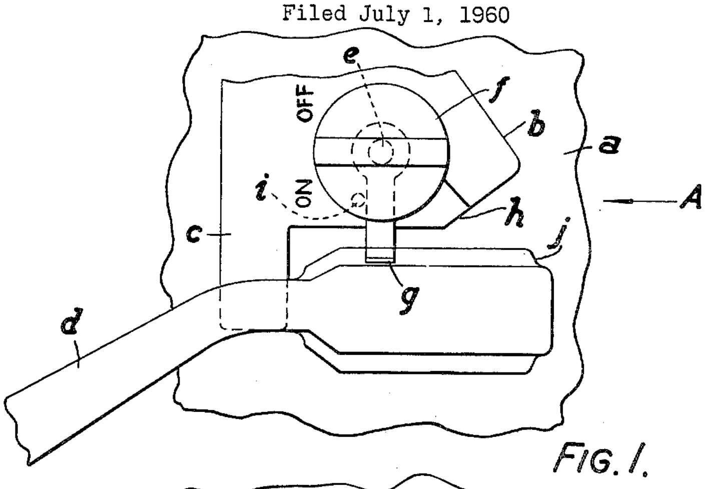
Figure 3:
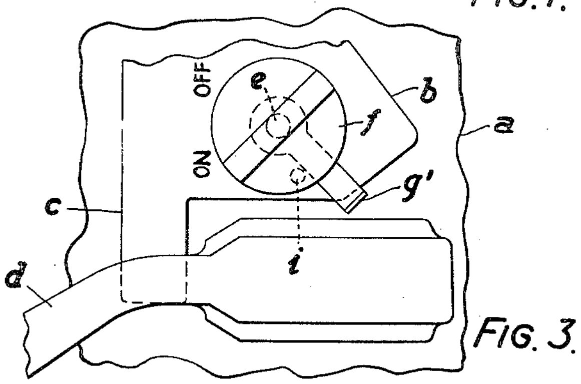
FIGURE 3 is a view similar to FIGURE 1 showing the on/off switch knob in the "on" position.
Figure 2:
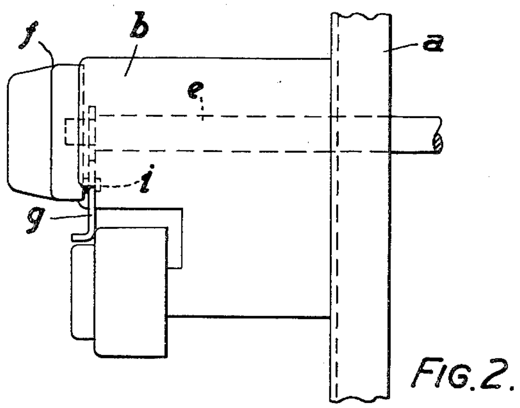
FIGURE 2 is an elevation in the direction of the arrow A of FIGURE 1.

Referring now to the drawings, the gramophone, for example a record-changer-type gramophone, carries on its base plate *a*, a switch bracket *b* formed with a tone-arm rest *c*, on which the tone arm *d* rests when out of operation. Rotatably mounted on the bracket *b* by means of a shaft *c* is an on/off switch knob *f*, which is shown in FIGURE 1 in the neutral position. A tone-arm locking-arm *g* is mounted for free rotation of the shaft *e* within a recess or cut-out *h* of the bracket *b*. The knob *f* is provided at its underside with an abutment *i*, for example a short stud, which, when the knob *f* is rotated in the anti-clockwise direction for switching on the gramophone motor, will set on the locking lever *g* so as to move the same from the position illustrated in FIGURE 1, in which it rests on a shoulder *i* of the pick-up housing forming part of the tone-arm *g* to the position indicated at $g^1$ in FIGURE 3, in which it is clear of said shoulder, thus permitting the gramophone drive to lift the tone arm off its rest *c* and move into the playing position. If subsequently the knob *f* is returned to the "off" or neutral position shown in FIGURE 1, this will not affect the locking lever *g*, which will remain in position $g^1$ until it is manually restored to the locking position.

What I claim is:

1. In an electrically driven disc-record playing apparatus having a record turntable, rotatable about an axis for receiving a disc record, a motor drive operatively connected with the turntable, a pickup arm movable for co-operation with such disc record from a position clear of said turntable, a pickup-arm rest on which said tone arm can rest when in such position clear of the turntable, cycling means driven by said motor drive to lift, at the beginning of a record-playing operation, the pickup arm from said rest and move it for co-operation with such disc record, and an on-off switch device controlling said motor drive and having an "on" position in which the motor drive is energised and an "off" position in which the motor drive is arranged to be de-energized, the combination comprising a pickup-arm locking device having a locking position preventing the pickup-arm when deposited on the pickup arm rest, from leaving said rest and moving into co-operation with such record and a non-locking position permitting free movement, and unidirectional coupling means on said locking device and switch device operative when the locking device is in its locking position and the switch device is moved to its "on" position to move the locking device to its non-locking position.

2. In an electrically driven disc-record playing apparatus having a record turntable, rotatable about an axis, for receiving a disc record, a motor drive operatively connected with the turntable, a pickup arm movable for co-operation with such disc record from a position clear of said turntable, a pickup-arm rest on which said tone arm can rest when in such position clear of the turntable, cycling means driven by said motor drive to lift, at the beginning of a record-playing operation, the pickup arm from said rest and move it for co-operation with such disc record, and an on-off switch member for the motor drive, said switch member having an "on" position at which the motor-drive is energised and being rotatable about an axis that is parallel to the turntable axis and located adjacent to said pickup arm rest, the combination comprising a tone-arm locking lever rotatable about said axis of the switch member to and from a locking position in which it prevents the pickup arm from leaving its rest, and abutment means on said switch member and locking lever operative when said lever is in said locking position and the switch member is turned to its "on" position, to turn said locking lever from its locking position to allow free movement of the pickup arm.

3. In an electrically driven disc-record playing apparatus having a record turntable, rotatable about an axis, for receiving a disc record, a motor drive operatively connected with the turntable, a pickup arm movable for co-operation with such disc record from a position clear of said turntable, a pickup-arm rest on which said tone arm can rest when in such position clear of the turntable, cycling means driven by said motor drive to lift at the beginning of a record-playing operation, the pickup arm from said rest and move it for co-operation with such disc record, and an on-off switch member for the motor drive, said switch member having an "on" position at which the motor-drive is energised and an "off" position at which the motor drive is arranged to be de-energised, and being rotatable about an axis that is parallel to the turntable axis and located adjacent to said pickup arm rest, the combination comprising a tone-arm locking lever rotatable about said axis of the switch member to and from a locking position in which it prevents the pick-up arm from leaving its rest, and unidirectional abutment means on said switch member and locking lever operative when said lever is in said locking position and the switch member is turned to its "on" position, to turn said locking lever from its locking position to allow free movement of the pickup arm but allowing the switch member to be returned from its "on" position to its "off" position without turning the locking arm to its locking position.

References Cited in the file of this patent

UNITED STATES PATENTS 2,944,824 Wennerbo ______________ July 12, 1960